United States Patent
Wu et al.

(10) Patent No.: US 10,179,704 B1
(45) Date of Patent: Jan. 15, 2019

(54) WARNING DEVICE OF ABNORMAL OPERATION OF BELT CONVEYOR

(71) Applicant: FINETEK Co., Ltd., New Taipei (TW)

(72) Inventors: Ting-Kuo Wu, New Taipei (TW);
Chien-Lung Huang, New Taipei (TW);
Wei-Chi Wu, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 0 days.

(21) Appl. No.: 15/924,196

(22) Filed: Mar. 17, 2018

(51) Int. Cl.
*B65G 15/28* (2006.01)
*B65G 43/02* (2006.01)
*B65G 43/00* (2006.01)
*B65G 43/08* (2006.01)

(52) U.S. Cl.
CPC ............ *B65G 43/02* (2013.01); *B65G 15/28* (2013.01); *B65G 2203/0208* (2013.01); *B65G 2203/044* (2013.01); *B65G 2203/047* (2013.01); *B65G 2207/40* (2013.01)

(58) Field of Classification Search
None
See application file for complete search history.

(56) References Cited

U.S. PATENT DOCUMENTS

| 4,173,276 A * | 11/1979 | Raudat | B65G 43/08 198/437 |
| 6,029,798 A * | 2/2000 | Miller | B65G 43/02 198/502.1 |

* cited by examiner

*Primary Examiner* — Kavel Singh
(74) *Attorney, Agent, or Firm* — Chun-Ming Shih; HDLS IPR Services (57) ABSTRACT

A warning device (1) of abnormal operation of belt conveyor (2) has a pair of rotating mechanisms (10) disposed oppositely at two sides of a conveyor belt (2). The rotating mechanism (10) includes a rotating component (11) and a rotating body 12. The rotating body 12 has a fixed end (121) and a movable end (122). A pair of first sensor switches (20) is disposed on the rotating bodies (12). The first sensor switch (20) emits a first signal when activated and emits a second signal when being triggered. The rotating body (12) triggers the first sensor switch (20) when the conveyor belt (2) is abnormal. The first sensor switch (20) is triggered and emits the second signal for warning.

18 Claims, 8 Drawing Sheets

WARNING DEVICE OF ABNORMAL OPERATION OF BELT CONVEYOR

BACKGROUND OF THE INVENTION

Field of the Invention

The present invention generally relates to a belt conveyor, more particular to, a warning device of abnormal operation of belt conveyor.

Description of Prior Art

Belt conveyors are widely used in various kinds of industries such as ports, machinery, cement industry, mining industry, power plants, steel industry and feed storage industry. A conveyor belt is generally composed of rubber belts, idlers and drive wheels. As rubber belts have elastic stretch, it will be elongated naturally after using a period of time. Therefore, users must adjust its tightness frequently. If not, the conveyor belt will get down, and then the efficiency of conveyance will be decreased. In severe cases, the drive wheels will rotate idly and the conveyor belt will be burned due to fixed-point rotation and frictional heat, and that may result in a shutdown or public security accidents.

Furthermore, belt conveyors can be installed at discharge outlets of storage tanks during transporting or to undertake consignments of previous conveyors. However, if there are dropped sharp materials piercing the conveyor belt but the conveyor belt continues running without shutdown, then sharp materials may get stuck on idlers or drive wheels, and the conveyor belt might be cut so that it will not be used anymore and discarded. Therefore, how to detect the transporting processes of the conveyor belt and provide an alarm when abnormal are the motivations of the present inventor.

In view of the above drawbacks, the Inventor proposes the present invention based on his expert knowledge and elaborate researches in order to solve the problems of prior art.

SUMMARY OF THE INVENTION

Accordingly, an object of the present invention is to provide a warning device of abnormal operation of belt conveyor, wherein the rotating bodies drive the first sensor switch moved and triggered when conveyed objects pierce out the belt or the belt is got down by overloading; therefore, the first sensor switch will be triggered and emits a second signal so that users can know the abnormal condition and deal with the problem early to avoid serious damages to the conveyor belt.

In order to achieve the object mentioned above, the present invention provides a warning device of abnormal operation of belt conveyor including a pair of rotating mechanisms and a pair of first sensor switches. The rotating mechanisms are disposed oppositely at two sides of the conveyor belt, and each of the rotating mechanisms comprises a rotating component and a rotating body driven by the rotating component. The rotating body has a fixed end connected with the rotating component and a movable end located opposite. The first sensor switches are disposed on the rotating bodies of the pair of the rotating mechanisms respectively. The first sensor switch emits a first signal when activated and emits a second signal when triggered; wherein the rotating body is touched by the conveyed objects stretched out the belt conveyor, and the first sensor switch will be triggered after the rotating body is touched and rotates. The triggered first sensor switch emits the second signal for warning.

Accordingly, an object of the present invention is to provide a warning device of abnormal operation of belt conveyor, wherein the warning device further includes a press rod and a second sensor switch; thus when the press portion is pressed by the conveyor belt got down to a certain position; then the second sensor switch will be triggered and emits a third signal so that users can know the abnormal condition for avoiding serious damages to the conveyor belt.

Compared to the prior art, the warning device of abnormal operation of belt conveyor is performed through the rotating body is touched and rotated for driving the first sensor switch moved so that the first sensor switch will be triggered and press the sensor switch for emitting the third signal when conveyed objects are stretched out the belt conveyor and pass the rotating mechanisms. Thereby, users can know abnormal conditions when the second signal or the third signal are received to avoid serious damages and increase the convenience and practicability of the present invention.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
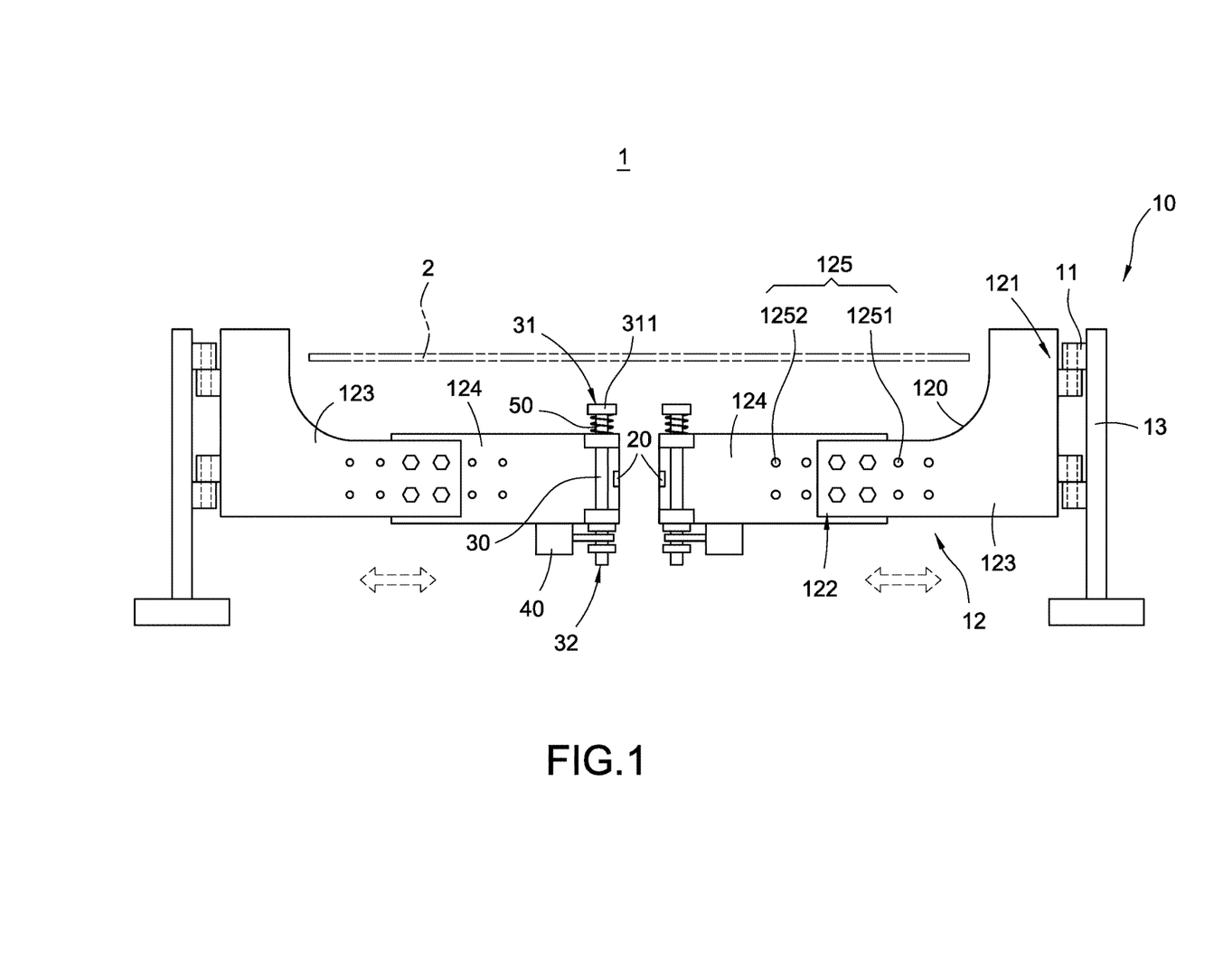
FIG. 1 is a plan schematic view of warning device of abnormal operation of belt conveyor of the present invention.
Figure 2:
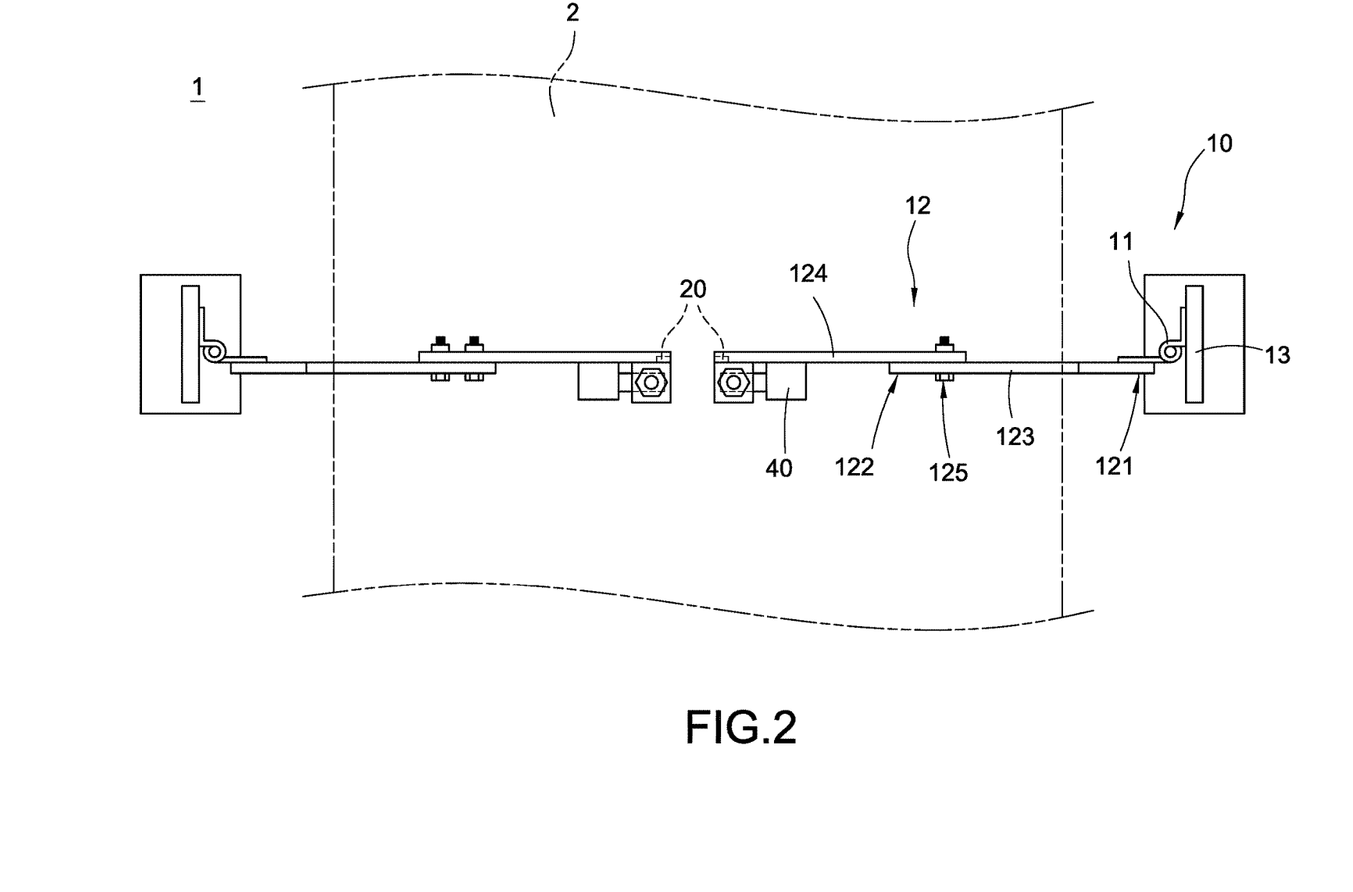
FIG. 2 is a partial schematic view of warning device of abnormal operation of belt conveyor of the present invention.

Please refer to FIG. 1 and FIG. 2, they depict a plan schematic view and a partial schematic view of a warning device of abnormal operation of belt conveyor. A warning device of abnormal operation of belt conveyor of the present invention includes a pair of rotating mechanisms 10 and a pair of first sensor switches 20. The pair of first sensor switches 20 are disposed on the pair of the rotating mechanisms 10 for detecting conveyed objects (not shown) on a conveyor belt 2. If the conveyed objects are sharp materials that might pierce the conveyor belt 2 and cause damages to the conveyed device. Therefore, the present invention gives a warning before the conveyed objects may cause damages to the conveyor belt 2 through the deposition of the warning device 1 of abnormal operation of belt conveyor. More details of the warning device 1 of abnormal operation of belt conveyor are described as follows.

The warning device 1 of the present invention includes a pair of rotating mechanisms 10. The pair of rotating mechanisms 10 are disposed oppositely at two sides of the conveyor belt 2. Each of the rotating mechanisms 10 comprises a rotating component 11 and a rotating body 12 driven by the rotating component 11. The rotating body 12 has a fixed end 121 connected with the rotating component 11 and a movable end 122 located oppositely.

Moreover, the warning device 1 of the present invention also includes a pair of first sensor switches 20. Each first sensor switches 20 is disposed on the rotating body 12 of the rotating mechanism 10 correspondingly, and the first sensor switch 20 emits a first signal when activated and emits a second signal when triggered. Besides, the rotating body 12 is touched by the conveyed objects stretched out the belt conveyor 2. The first sensor switches 20 will be triggered after the rotating body 12 is touched and rotates, and then the triggered first sensor switch 20 emits the second signal for warning.

Preferably but not limited, the first sensor switch 20 is a micro switch, a reed switch, an optical switch or a photo interrupter and so on.

In an embodiment of the present invention, the warning device 1 includes at least one press rod 30 and a second sensor switch 40. The press rod 30 is disposed at the movable end 122 of the rotating body 12; the second sensor switch 40 is disposed at the press rod 30 and emits a third signal after being triggered. In real practice, the press rod 30 touches the second sensor switch 40 in a forward, lateral, or rotational direction.

Specifically, the press rod 30 has a top end 31 and a bottom end 32 opposite. In addition, the press rod 30 has a press portion 311 at the top end 31, and the second sensor switch 40 is disposed at the bottom end 32. Preferably, the warning device 1 further includes at least one restoring spring 50, and the restoring spring 50 is sleeved with the press rod 30 and disposed between the top end 31 and the press portion 311. In real practice, the restoring spring 50 can be restored in a forward, lateral, or rotational direction.

Therefore, the press portion 311 triggers the second sensor switch 40 and emits a third signal after being pressed by an external force (belt deformed). Furthermore, the press portion 311 can go back to the original position through the restoring spring 50 after the external force is removed.

In further, the rotating mechanism 10 further includes a position base 13, and the rotating component 11 is disposed at the position base 13. In the present embodiment, the rotating component 11 is a hinge, and the rotating body 12 includes a plate 123. Thus, the hinge can take the plate 123 rotating after the plate combining to the hinge. Similarly, the hinge will be rotated when the plate 123 is touched. In real practice, the implement of the rotating component 11 and the rotating body 12 can be changed just to achieve intended functions.

Figure 3:
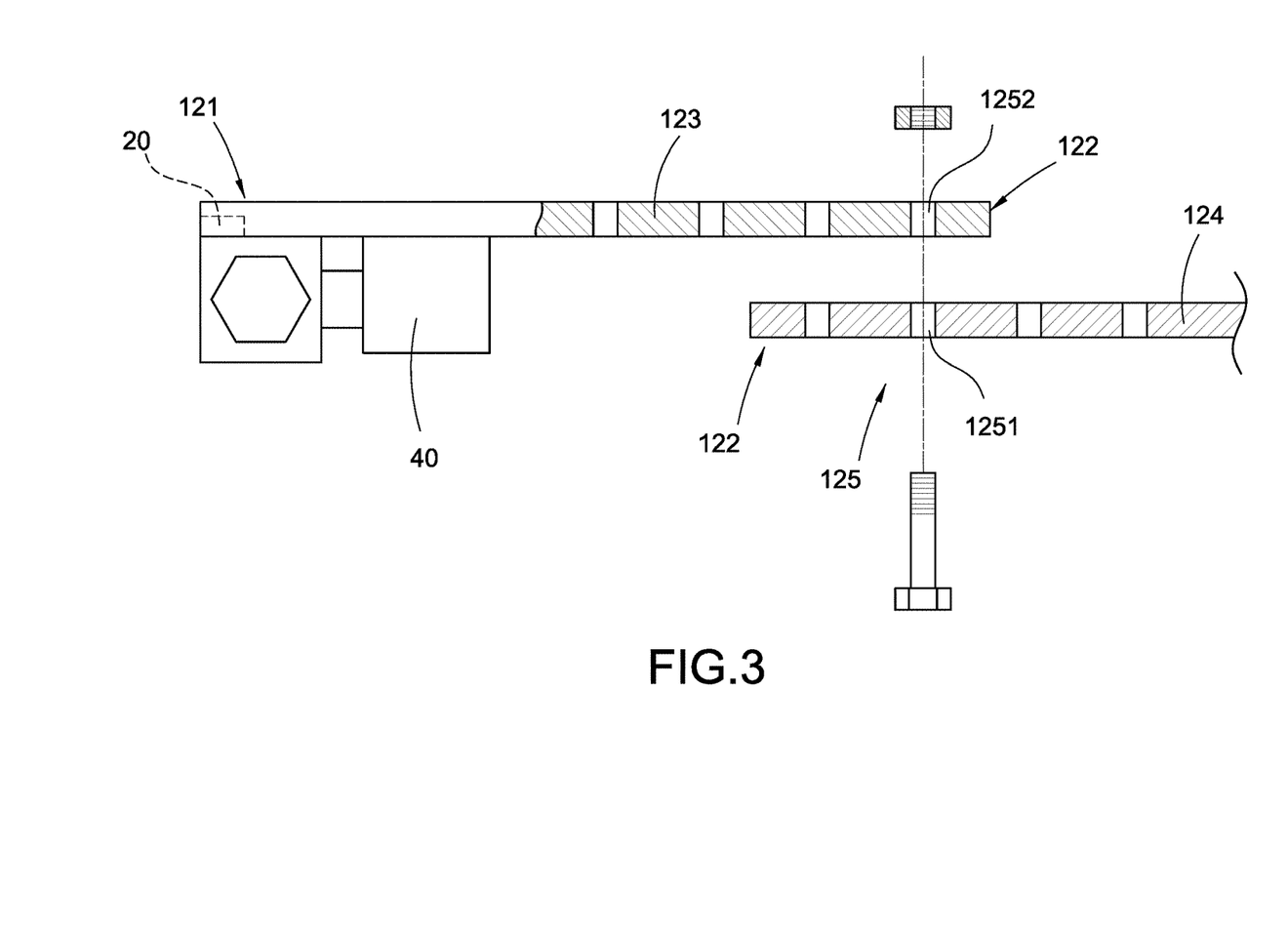
FIG. 3 is an assembly schematic view of the rotating body of the present invention.

Preferably, the rotating body 12 further includes an extension plate 124 and a positioning mechanism 125. The extension plate 124 can be detachably combined in an outer side of the plate 123 through the positioning mechanism 125.

Please refer to FIG. 3, it depicts an assembly schematic view of a rotating body of the present invention. In the present embodiment, the plate 123 is provided with a plurality of first positioning portions 1251. Besides, the extension plate 124 is provided with a plurality of second positioning portions 1252. The first positioning portions 1251 can be selectively positioned at a predetermined second positioning portion 1252 for adjusting the overall length of the plate 123 and the extension plate 124 after combining, and that is the length of the rotating body 12. Therefore, the length of the rotating body 12 can be adjusted according to the usage of conveyor belt 2.

It is worth noting that the rotating bodies 12 of the pair of the rotating mechanisms 10 have formed with a concave area 120 separately, preferably but not limited, the concave area 120 is an arc opening. In addition, the conveyor belt 2 is disposed in the concave areas 120 between the pair of the rotating mechanisms 10, and then the conveyor belt 2 can be adjusted to be located above the pressing rod 30 according to the concave areas 120. Therefore, when the conveyor belt 2 is in a loosen state and got down, the pressing portion 311 of the top end 31 of the pressing rod 30 will be pressed to trigger the second sensing switch 40 for emitting a signal.

Figure 4:
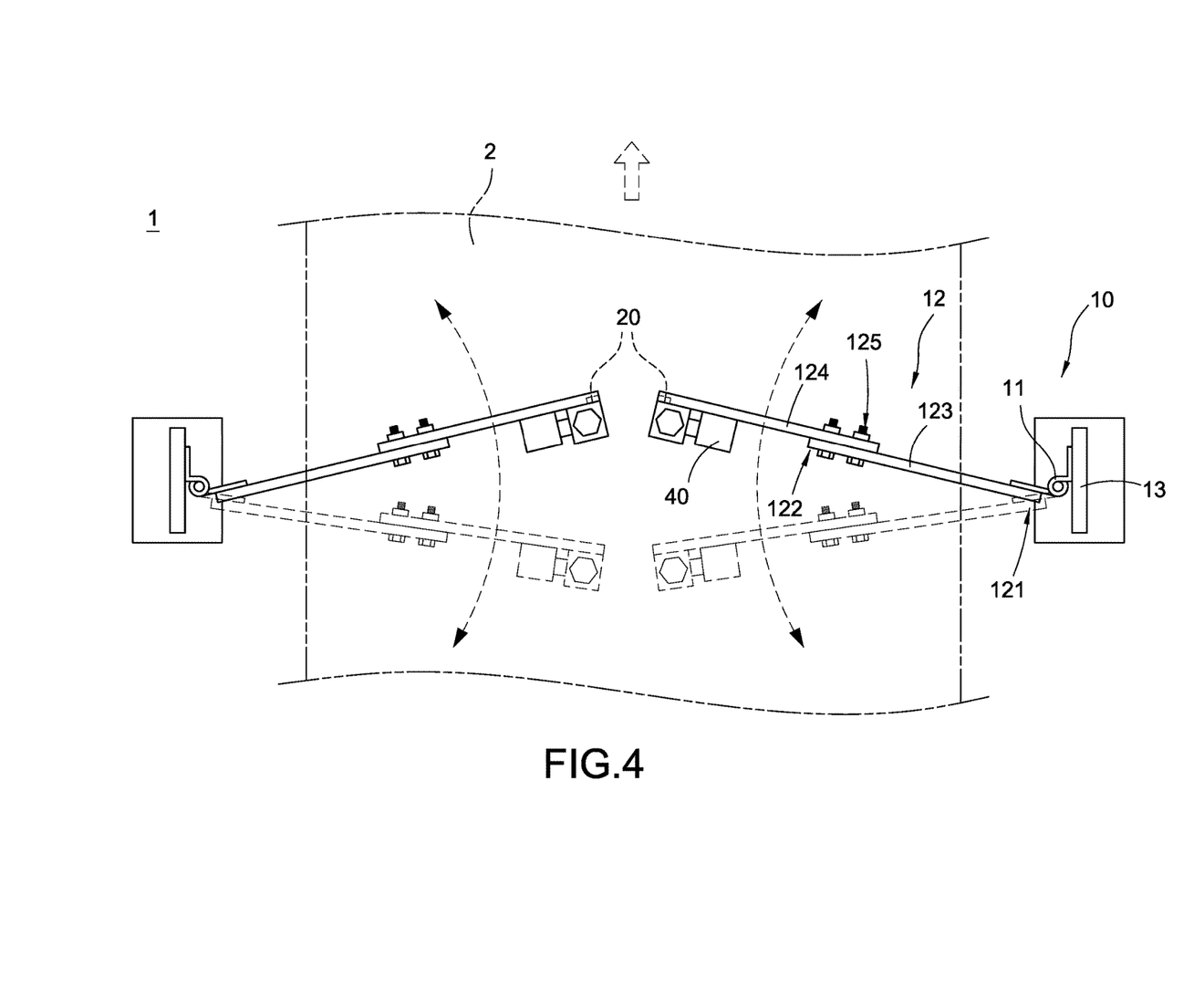
FIG. 4 is an operation schematic view of the warning device of abnormal operation of belt conveyor of the present invention.

Please also refer to FIG. 4, it depicts a schematic view of the use of the warning device of abnormal operation of belt conveyor of the present invention. In the present embodiment, when the conveyed object is stretched out the belt conveyor belt 2 and pass through the rotating mechanism 10, the rotating body 12 will be touched and rotates. In addition, the first sensor switches 20 moves with the rotating body 12; at this moment, the first sensor switches 20 are activated and emit the second signal. In real practice, the second signal can be transmitted to a control system to generate an alarm so that the user can know the abnormal condition and deal with the problem early to avoid serious damages to the conveyor belt 2.

Figure 5:
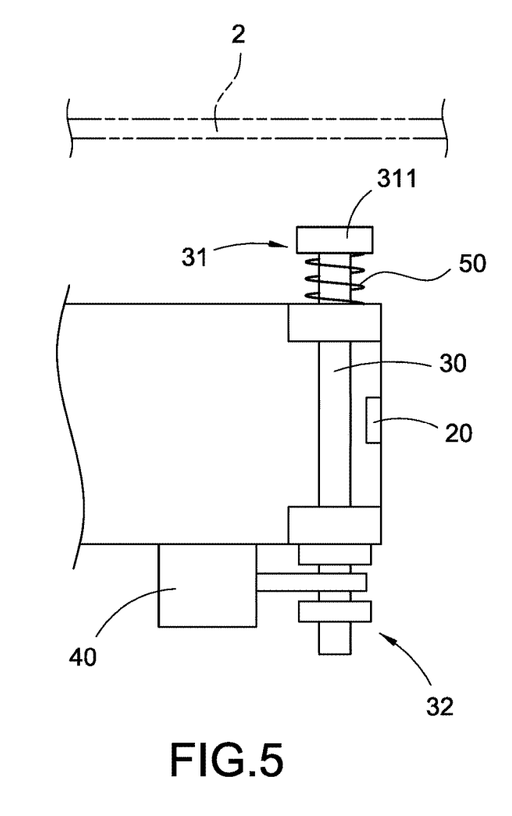
FIG. 5 is a partial enlarged schematic view of the warning device of abnormal operation of belt conveyor of the present invention.
Figure 6:
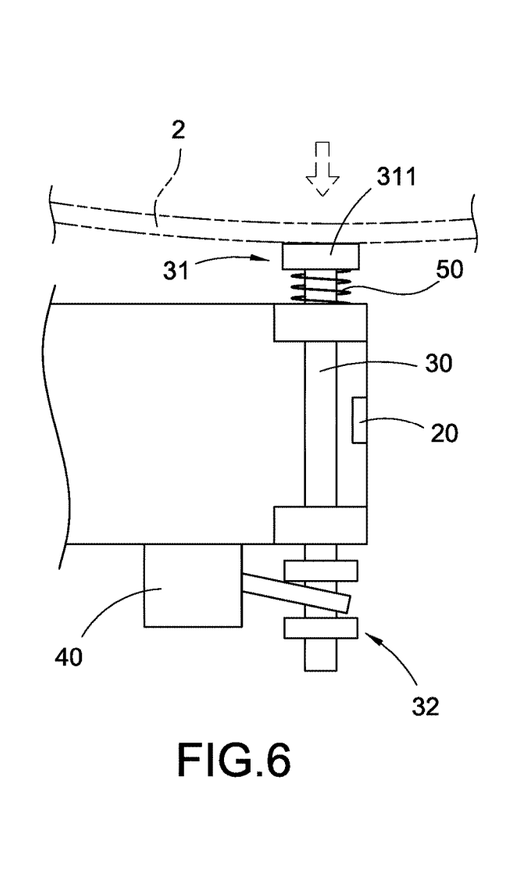
FIG. 6 is another operation schematic view of the warning device of abnormal operation of belt conveyor.

Please further refer to FIG. 5 and FIG. 6, they depict a partial enlarge schematic view and another operation schematic view of the warning device of abnormal operation of belt conveyor of the present invention. As shown in FIGs, when the conveyor belt 2 is loosen after using a period of time or deformed due to heavy conveyed objects, the press portion 311 of the press rod 30 will be pressed by the conveyor belt 2 because the conveyor belt 2 is got down to a certain position. At this moment, the second sensor switch 40 is activated and emits the third signal after the press portion 311 is pressed by an external force (belt deformed). In real practice, the third signal can be transmitted to a control system to generate an alarm so that the user can know the abnormal condition and deal with the problem early to avoid serious damages to the conveyor belt.

It is worth noting that the implementation of the rotating mechanism 10 of the present invention can be adjusted according to requirements. In the present embodiment, the rotating bodies 12 of the pair of the rotating mechanisms 10 are disposed in a direction perpendicular to a forward direction of the conveyor belt 2 (as shown in FIG. 4).

Figure 7:
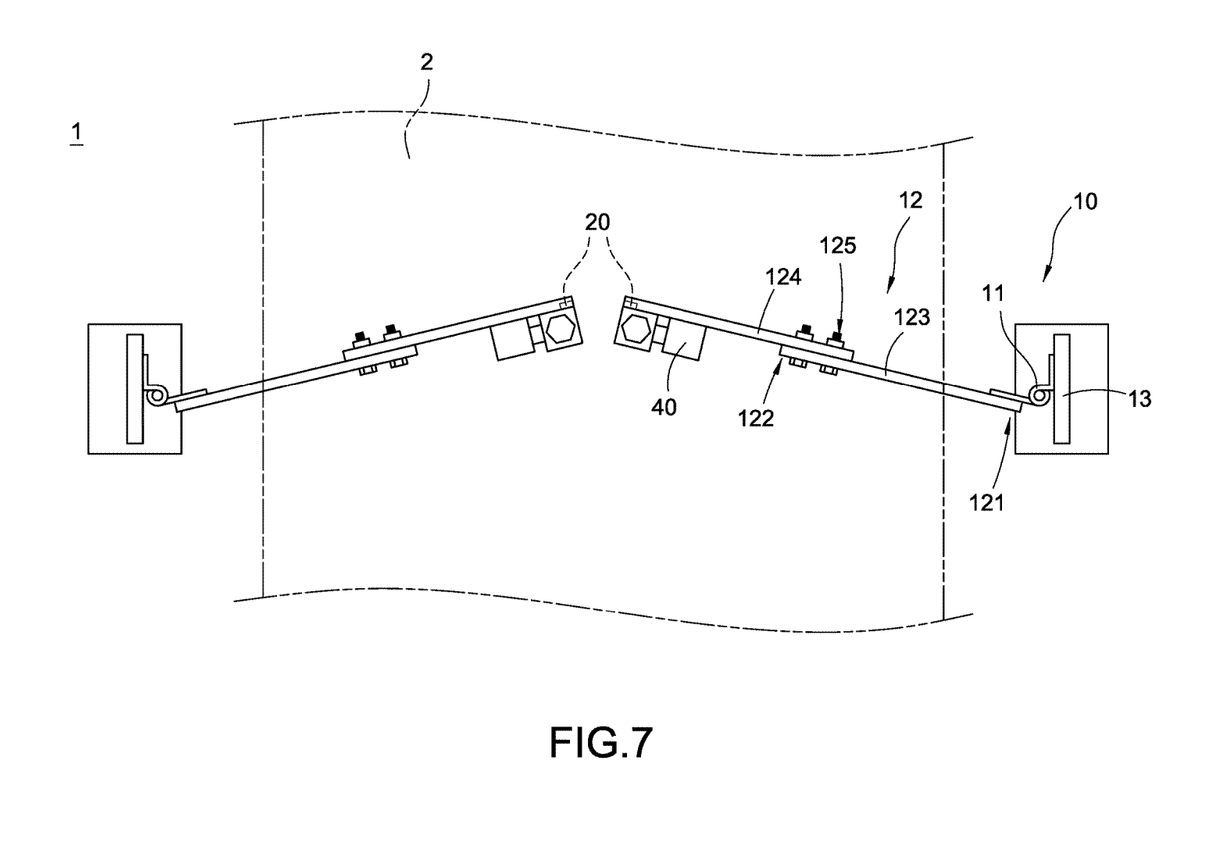
FIG. 7 to FIG. 9 are another three embodiments of the warning device of abnormal operation of belt conveyor.
Figure 8:
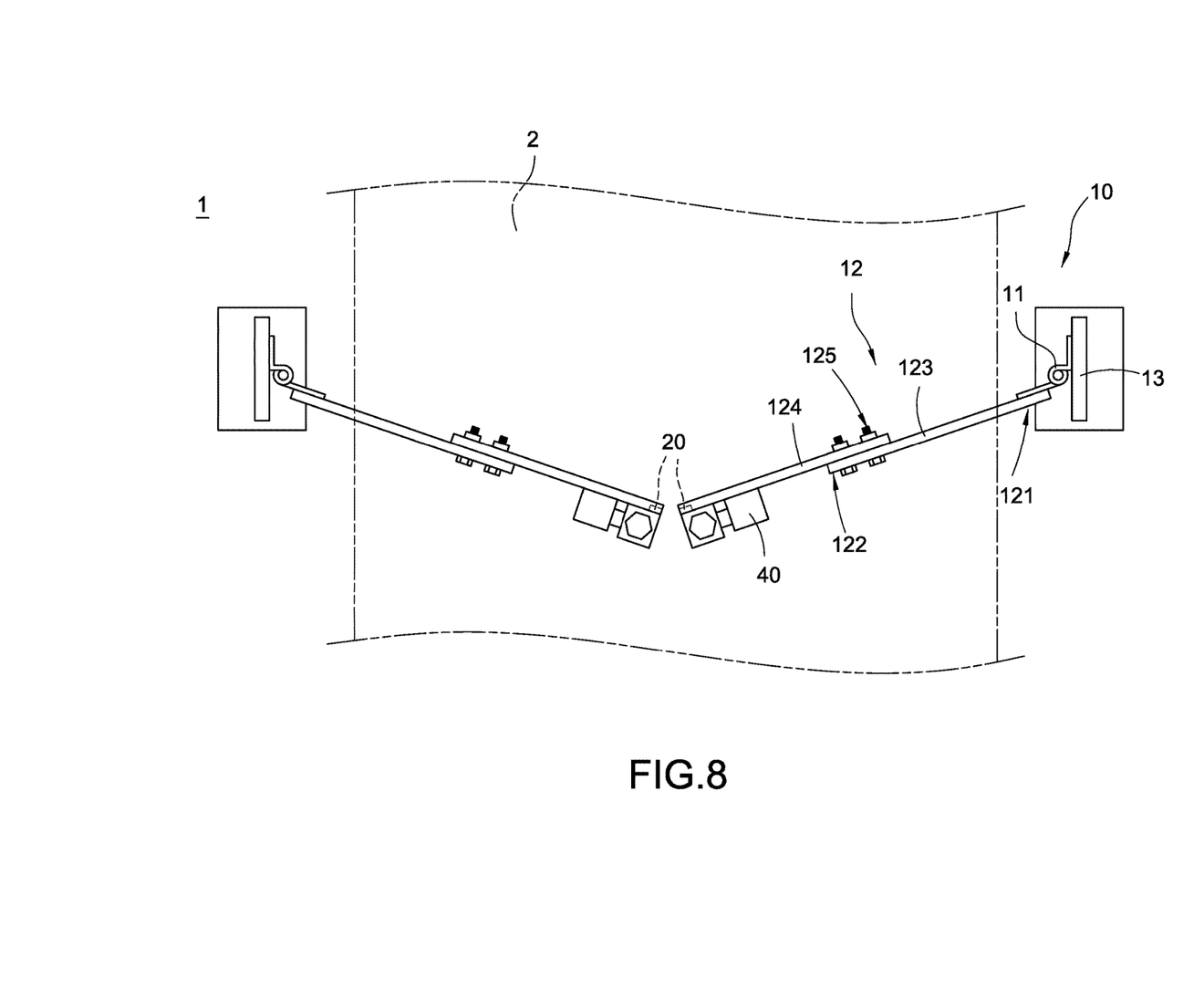
Figure 9:
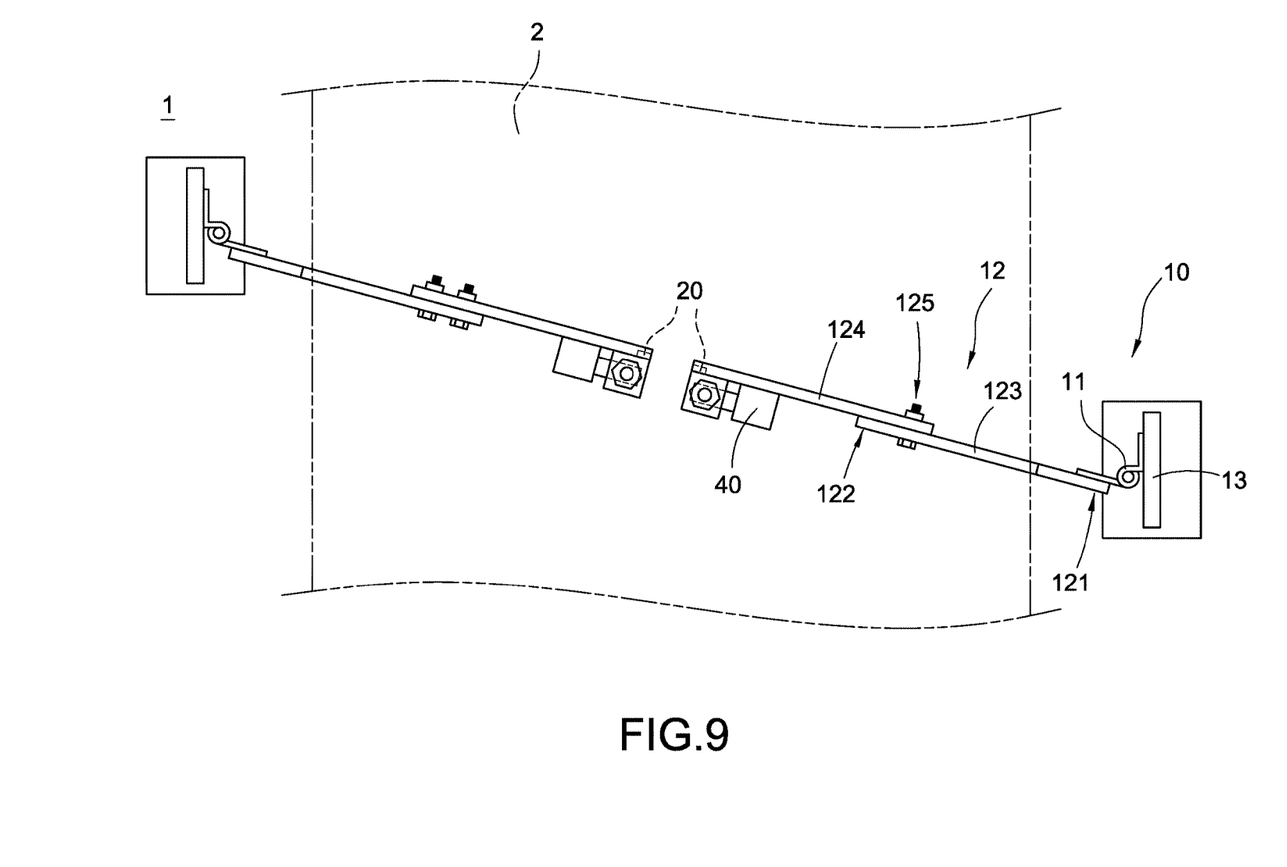

Please also refer to FIG. 7 to FIG. 9, they depict another three embodiments of the warning device of abnormal operation of belt conveyor. As shown in FIG. 7 and FIG. 8, the rotating bodies 12 of the pair of the rotating mechanisms 10 are arranged at an angle with each other. In FIG. 7, the pair of the rotating bodies 12 and the conveyor belt 2 are configured in an inverted V-shape. In addition, in FIG. 8, the pair of the rotating bodies 12 and the conveyor belt 2 are configured in a V-shape. Furthermore, in FIG. 9, the pair of the rotating bodies 12 and the conveyor belt 2 are disposed at an angle with respect to a forward direction of the conveyor belt 2. In real practice, the angle and the position of the pair of the rotating bodies 12 with respect to the conveyor belt 2 can be adjusted depend on needs.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A warning device of abnormal operation of belt conveyor for detecting conveyed objects on a conveyor belt (2), including:
   a pair of rotating mechanisms (10) disposed oppositely at two sides of the conveyor belt (2); each of the rotating mechanisms (10) comprising a rotating component (11) and a rotating body (12) driven by the rotating component (11); the rotating body (12) having a fixed end (121) connected with the rotating component (11) and a movable end (122) located oppositely;
   a pair of first sensor switches (20) disposed on rotating bodies (12) of the pair of the rotating mechanisms (10) respectively; the first sensor switch (20) emitting a first signal when being activated and emitting a second signal when being triggered; wherein the rotating body (12) is touched by the conveyed objects stretched out the belt conveyor (2), and the first sensor switch (20) will be triggered after the rotating body (12) is touched and rotates, and then the triggered first sensor switch (20) emits the second signal for warning; and
   at least one press rod (30) and a second sensor switch (40), wherein the press rod (30) is disposed at the movable end (122) of the rotating body (12); the second sensor switch (40) is disposed at the press rod (30) and emits a third signal after being triggered; the press rod (30) has a top end (31) and a bottom end (32) opposite; the press rod (30) has a press portion (311) at the top end (31); the second sensor switch (40) is disposed at the bottom end (32), and the press rod (30) touches the second sensor switch (40) in a forward, lateral, or rotational direction.

2. The warning device of abnormal operation of belt conveyor according to claim 1, wherein the rotating mechanism (10) further includes a position base (13), and the rotating component (11) is disposed at the position base (13).

3. The warning device of abnormal operation of belt conveyor according to claim 1, wherein the rotating component (11) is a hinge, and the rotating body (12) includes a plate (123).

4. The warning device of abnormal operation of belt conveyor according to claim 3, wherein the rotating body (12) further includes an extension plate (124) and a positioning mechanism (125); the extension plate (124) can be detachably combined in an outer side of the plate (123) through the positioning mechanism (125).

5. The warning device of abnormal operation of belt conveyor according to claim 3, wherein the rotating bodies (12) of the pair of the rotating mechanisms (10) have formed with a concave area (120) separately; the conveyor belt (2) is disposed in concave areas (120) between the pair of the rotating mechanisms (10).

6. The warning device of abnormal operation of belt conveyor according to claim 1, wherein the first sensor switch (20) is a micro switch, a reed switch, an optical switch or a photo interrupter.

7. The warning device of abnormal operation of belt conveyor according to claim 1, wherein rotating bodies (12) of the pair of the rotating mechanisms (10) are disposed in a direction perpendicular to a forward direction of the conveyor belt (2).

8. The warning device of abnormal operation of belt conveyor according to claim 1, wherein rotating bodies (12) of the pair of the rotating mechanisms (10) are disposed at an angle with respect to a forwarding direction of the conveyor belt.

9. The warning device of abnormal operation of belt conveyor according to claim 1, wherein rotating bodies (12) of the pair of the rotating mechanisms (10) are arranged at an angle with each other.

10. A warning device of abnormal operation of belt conveyor for detecting conveyed objects on a conveyor belt (2), including:
    a pair of rotating mechanisms (10) disposed oppositely at two sides of the conveyor belt (2); each of the rotating mechanisms (10) comprising a rotating component (11) and a rotating body (12) driven by the rotating component (11); the rotating body (12) having a fixed end (121) connected with the rotating component (11) and a movable end (122) located oppositely; and
    a pair of first sensor switches (20) disposed on rotating bodies (12) of the pair of the rotating mechanisms (10) respectively; the first sensor switch (20) emitting a first signal when being activated and emitting a second signal when being triggered; wherein the rotating body (12) is touched by the conveyed objects stretched out the belt conveyor (2), and the first sensor switch (20) will be triggered after the rotating body (12) is touched and rotates, and then the triggered first sensor switch (20) emits the second signal for warning;
    at least one press rod (30) and a second sensor switch (40), wherein the press rod (30) is disposed at the movable end (122) of the rotating body (12); the second sensor switch (40) is disposed at the press rod (30) and emits a third signal after being triggered; the press rod (30) has a top end (31) and a bottom end (32) opposite; the press rod (30) has a press portion (311) at the top end (31); the second sensor switch (40) is disposed at the bottom end (32), and the press rod (30) touches the second sensor switch (40) in a forward, lateral, or rotational direction; and
    at least one restoring spring (50), wherein the restoring spring (50) is sleeved with the press rod (30) and disposed between the top end (31) and the press portion (311), and the restoring spring (50) is restored in a forward, lateral, or rotational direction.

11. The warning device of abnormal operation of belt conveyor according to claim 10, wherein the rotating mechanism (10) further includes a position base (13), and the rotating component (11) is disposed at the position base (13).

12. The warning device of abnormal operation of belt conveyor according to claim 10, wherein the rotating component (11) is a hinge, and the rotating body (12) includes a plate (123).

13. The warning device of abnormal operation of belt conveyor according to claim 12, wherein the rotating body (12) further includes an extension plate (124) and a positioning mechanism (125); the extension plate (124) can be detachably combined in an outer side of the plate (123) through the positioning mechanism (125).

14. The warning device of abnormal operation of belt conveyor according to claim 12, wherein the rotating bodies (12) of the pair of the rotating mechanisms (10) have formed with a concave area (120) separately; the conveyor belt (2) is disposed in concave areas (120) between the pair of the rotating mechanisms (10).

15. The warning device of abnormal operation of belt conveyor according to claim 10, wherein the first sensor switch (20) is a micro switch, a reed switch, an optical switch or a photo interrupter.

16. The warning device of abnormal operation of belt conveyor according to claim 10, wherein rotating bodies (12) of the pair of the rotating mechanisms (10) are disposed in a direction perpendicular to a forward direction of the conveyor belt (2).

17. The warning device of abnormal operation of belt conveyor according to claim 10, wherein rotating bodies (12) of the pair of the rotating mechanisms (10) are disposed at an angle with respect to a forwarding direction of the conveyor belt.

18. The warning device of abnormal operation of belt conveyor according to claim 10, wherein rotating bodies (12) of the pair of the rotating mechanisms (10) are arranged at an angle with each other.

* * * * *